(No Model.) 3 Sheets—Sheet 1.
A. J. WRIGHT.
BRAKE MECHANISM FOR CARS.
No. 430,455. Patented June 17, 1890.
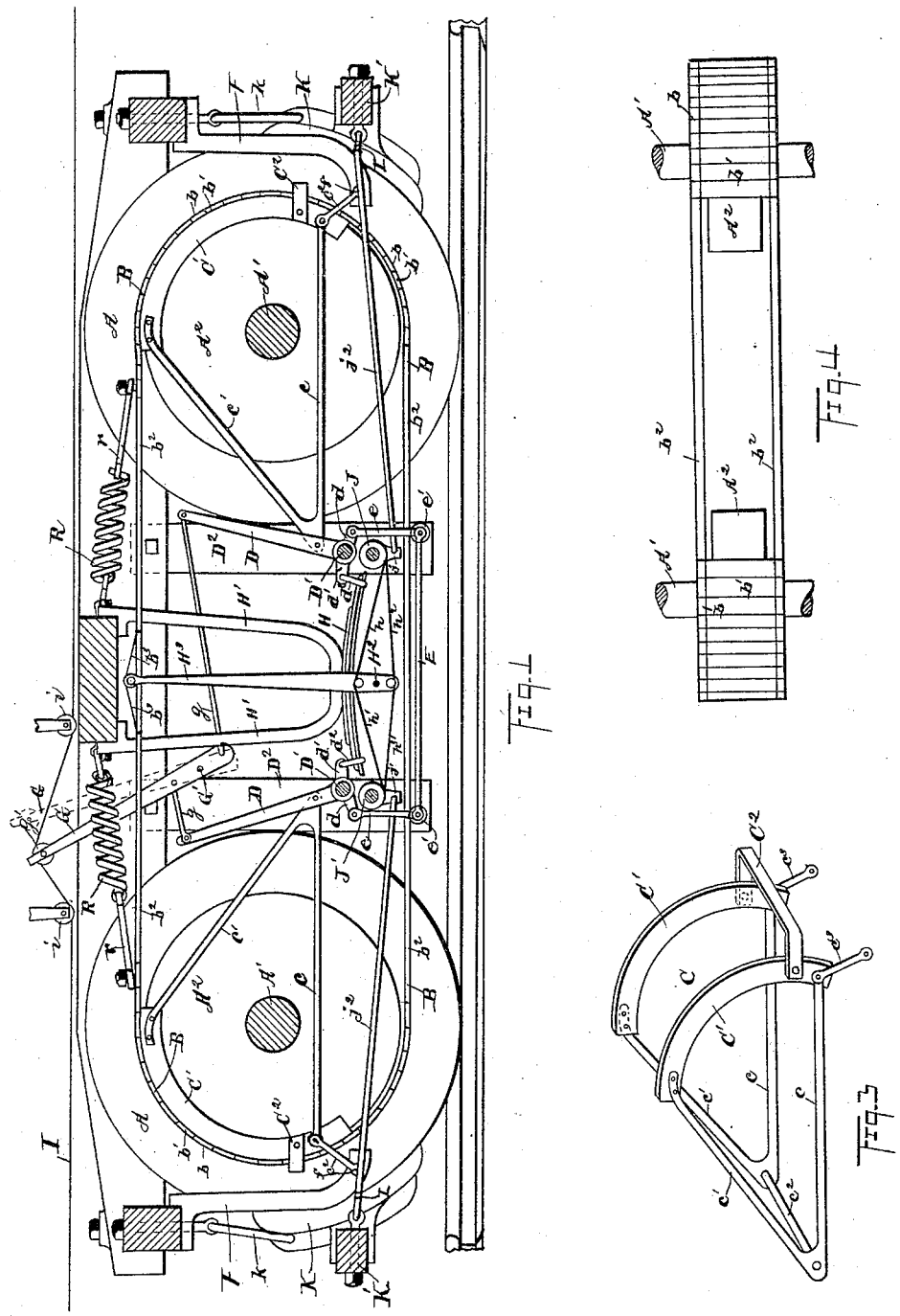
Witnesses
Inventor
Attorneys

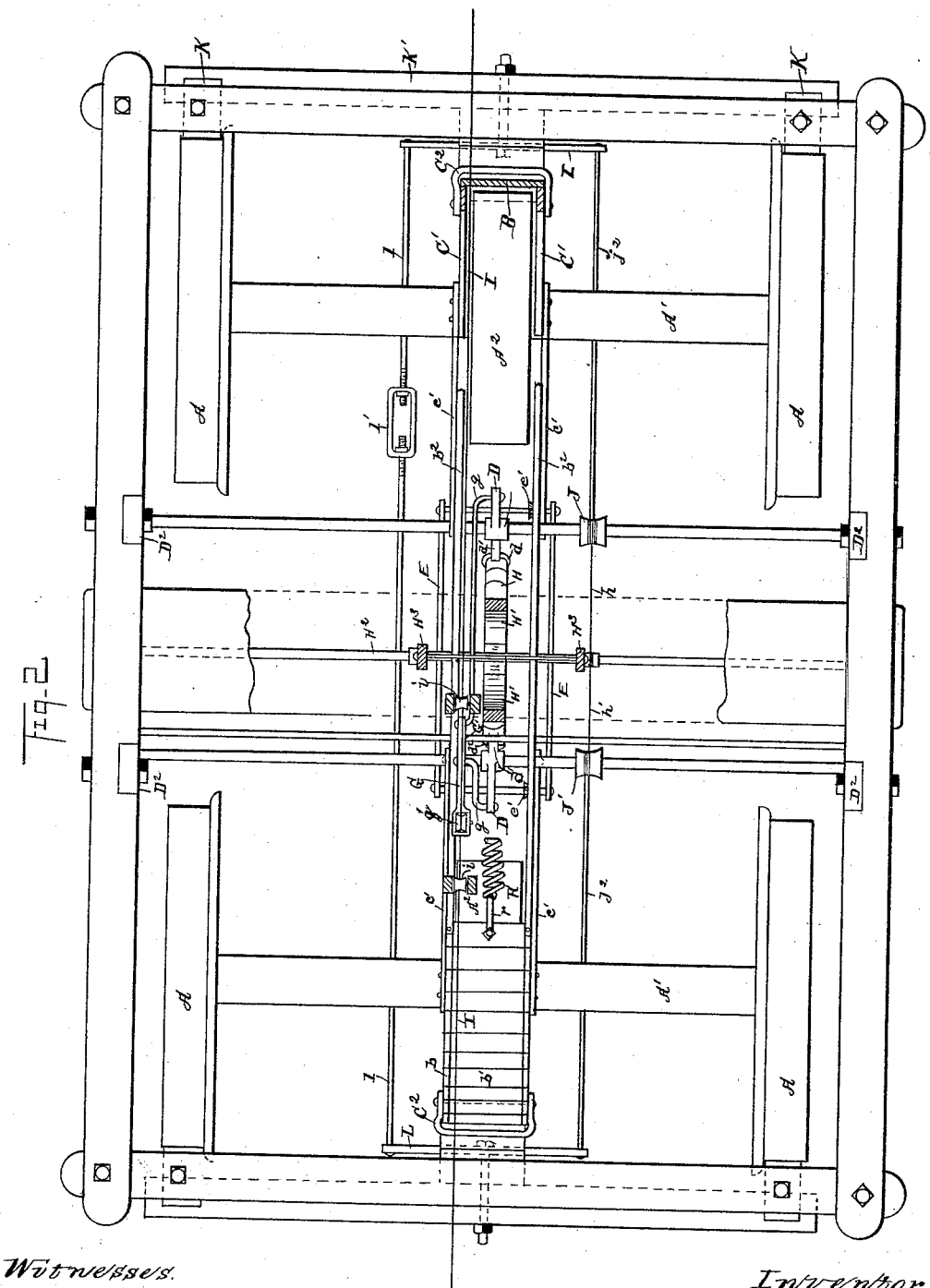

(No Model.) 3 Sheets—Sheet 3.
A. J. WRIGHT.
BRAKE MECHANISM FOR CARS.
No. 430,455. Patented June 17, 1890.
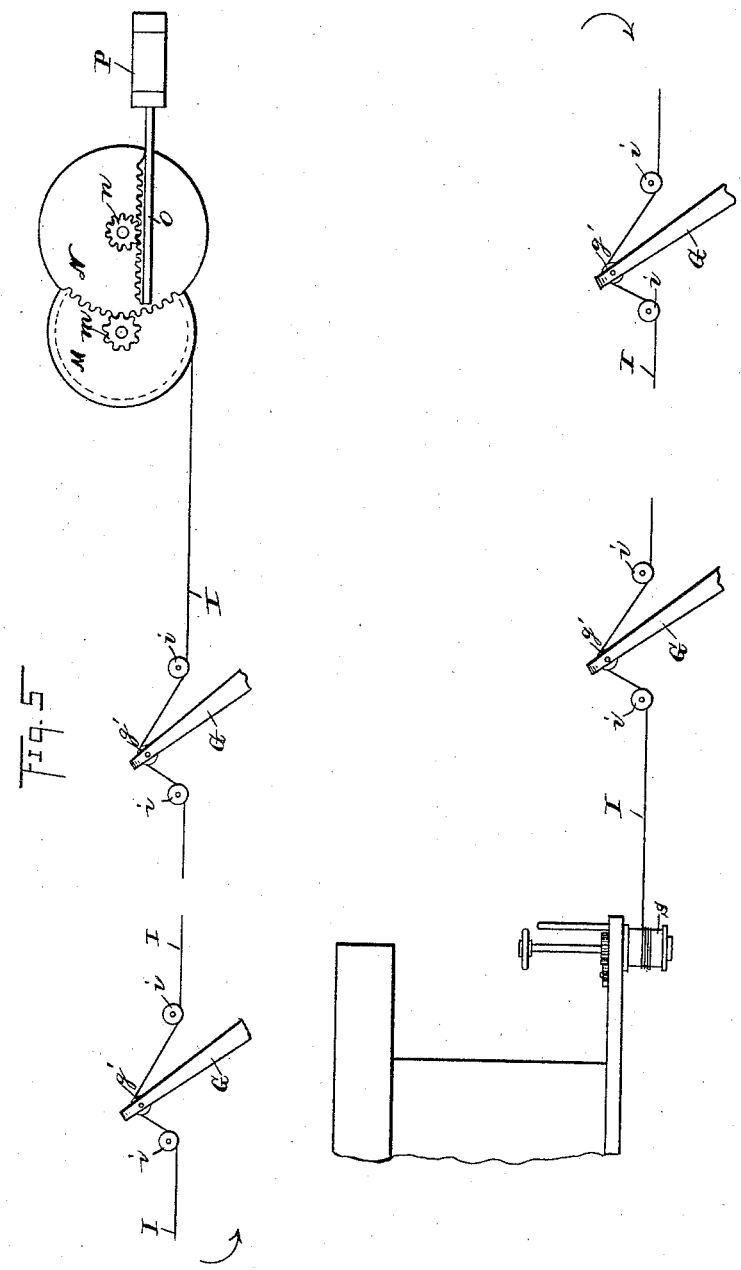
Witnesses
Inventor
Allen J. Wright
Leggett and Leggett
Attorneys

UNITED STATES PATENT OFFICE.

ALLEN J. WRIGHT, OF CLEVELAND, OHIO.

BRAKE MECHANISM FOR CARS.

SPECIFICATION forming part of Letters Patent No. 430,455, dated June 17, 1890.

Application filed November 18, 1889. Serial No. 330,692. (No model.)

*To all whom it may concern:*

Be it known that I, ALLEN J. WRIGHT, of Cleveland, in the county of Cuyahoga and State of Ohio, have invented certain new and useful Improvements in Brake Mechanism for Cars; and I do hereby declare the following to be a full, clear, and exact description of the invention, such as will enable others skilled in the art to which it pertains to make and use the same.

My invention relates to improvements in brake mechanism for cars; and it consists in certain features of construction and in combination of parts hereinafter described, and pointed out in the claims.

I have chosen to illustrate and describe my invention as applied to an ordinary train of freight-cars.

In the accompanying drawings, Figure 1 is a side elevation partly in section. Fig. 2 is a plan taken below the body of the car, portions being broken away to show the construction. Fig. 3 is a view in perspective in detail, hereinafter described. Fig. 4 is a plan in detail, hereinafter described. Fig. 5 is a diagrammatic view in side elevation.

A A represent car-wheels, and A' A' the car-axles.

$A^2$ $A^2$ are friction-wheels mounted on the car-axles usually midway thereof, as shown in Fig. 2.

B is a so-called "friction-band" operatively connected with the brakes and adapted to engage wheels $A^2$ $A^2$, by means of which engagement the friction-band is actuated and the brakes set. The friction-band only moves a limited distance in the one direction or the other, according to the direction that the cars are traveling, and hence only sections of this friction-band need be adapted to engage wheels $A^2$ $A^2$.

The construction of the friction-band is preferably as follows: $b\ b$ are thin metal bands, to which are attached transverse slats or shoes $b'$, the latter being preferably of metal and having of course concaved inner faces adapted to fit wheels $A^2$. Wire cables $b^2$ are attached to the opposing ends of bands $b$. In place of wire cables chains might be employed; but the cables are lighter and operate more smoothly over the tightening-sheaves, hereinafter described, and hence I prefer the cables to the chains. The sections of the friction-band that engage wheel $A^2$ are broader than the wheels and overhang the wheels on either side for engaging the peripheral edges of plates $C'$ of frame C. (See Fig. 3.) Plates $C'$ are curved so that their outer edges correspond in radial dimensions with wheels $A^2$. These plates are arranged in pairs astride the wheels and in the positions shown in Fig. 1, the two plates constituting a pair being rigidly connected by yoke $C^2$; also, rods $c\ c$ and $c'\ c'$ are rigidly secured to the respective plates $C'$, and these rods connect with cross-bars $C^2$, thus constituting rigid frames, one such frame being shown more clearly in Fig. 3. Links $c^3$ are pivoted near the lower ends of plate C, the links in turn being pivoted at $f$ to brackets F, the latter being attached to the truck-frame. Cross-bars $c^2$ connect, respectively, with levers D, by operating which lever frames C are backed off to separate the friction-bands from wheels $A^2$. From the inclined position of links $c^3$, as shown, it is evident that in backing off frame C the latter will be elevated more or less, so as to lift the friction-band off from the top section of these wheels, and that a corresponding depression of the friction-band will occur when frames C are moved inward, whereby the friction-bands are made to engage the wheels. I will remark that it is not necessary for plate $C'$ to extend farther downward than shown, as the friction-bands by gravity will separate from wheels $A^2$ along the under section thereof.

Levers D are respectively pivoted at $D'$ to brackets $D^2$, the latter being attachments of the truck-frame. These levers are of inverted-T shape, or what might be called "double bell-crank" levers, having short arms $d$ and $d'$ extending in opposite directions from the pivotal point, as shown. To arms $d$ are pivotally attached links $e$, the latter in turn connecting with tightener-frame E, the latter bearing sheaves $e'$, that engage the under side of the lower set of cables $b^2$ aforesaid. Arms $d'$ connect with links $d^2$, and these in turn connect with the extremes of spring H. This spring is preferably of the variety shown, the central section thereof being fastened for support to bracket $H'$ of the truck-frame. This bracket has a member extending down below the spring, to which member at $H^2$ is pivoted lever $H^3$, hereinafter mentioned.

G is a lever pivoted at G', and at equal distances above and below the fulcrum thereof are attached rods $g\ g$, these rods connecting, respectively, with the upper ends of levers D D. With lever G in the inclined position, (shown in solid lines, Fig. 1,) and by means of the connecting mechanism already described, the position and relation of parts will be as follows: Spring H will be strained, tightener-frame E will be in its depressed position, as shown, whereby cables $b^2$ will be slacked, and frames C will be backed off a trifle, so that the friction-band does not engage wheels $A^2$, or, in other words, the brake mechanism will be inoperative. Lever G is held in the inclined position shown in solid lines as against the action of spring H by means of cord I in the manner hereinafter described. If cord I be loosened and lever G thereby released, the recoil of spring H will cause levers D to approach each other, and in so doing will shift lever G to the less inclined position shown in dotted lines, and the movements of levers D inward or toward each other will correspondingly shift frames C, so that the friction-band will rest on wheels $A^2$, and at the same time will elevate tightener-frame E, thus tightening the friction-band, so that the latter will be actuated in the direction that wheels $A^2$ are moving.

For transmitting the movement of the friction-band to the brakes proper I provide means as follows: To the upper end of lever $H^3$ are attached cords or flexible members $b^3\ b^3$, these members extending in opposite direction a suitable distance, where they are connected with the upper cables $b^2$ aforesaid, or to whatever may take the place of such cables. With such construction it is evident that if the brake-band of which these cables form a part be actuated in either direction lever $H^3$ will be correspondingly moved.

To lever $H^3$ are attached, a short distance above the fulcrum thereof, cords, straps, or chains (and we will suppose the former) $h\ h'$, these cords leading to the right and left, as shown. At an equal distance below the fulcrum of the lever are attached thereto cords $h^2\ h^3$, these cords leading to the right and left, as shown.

J and J' are shafts having, respectively, attached arms $j\ j'$, these arms being located in the position shown, and having, respectively, attached rods $j^2\ j^2$, leading in opposite directions. Cords $h\ h^2$ lead under and wrap round and fasten to shaft J. Cords $h'\ h^3$ lead under, wrap round, and fasten to shaft J'. With such construction, if lever $H^3$ were moved toward the right hand, such movement would slack cords $h\ h^3$ and would draw on cords $h'\ h^2$, whereby shafts J J' would be rotated in the direction to draw on rods $j^2\ j^2$. If lever $H^3$ were moved in the opposite direction, cords $h'\ h^2$ would slack off and cords $h\ h^3$ would rotate shafts J J' in the same direction as aforesaid, so as to draw on rods $j^2\ j^2$.

K K are the brake-shoes for engaging wheels A, these shoes being attached in pairs to brake-bars K', the latter being supported by links $k$, all of ordinary construction. The position of these links may be such that the brakes when released will back off from the wheels by gravity of the parts, or springs may be attached to the brake-bars for the purpose, either method being well known. To brake-bars K are pivotally attached levers L L, these levers at the one extreme being connected by means of rod $l$, the latter being provided with turn-buckle $l'$ for adjusting the parts. The other ends of levers L connect, respectively, with rods $j^2$ aforesaid.

To recapitulate, lever G is held by cord I against the action of spring H, in which position of parts the brakes remain inoperative. By releasing lever G the recoil of spring H causes the friction-band to engage wheel $A^2$ and at the same time causes the friction-band to be tightened, and the movement of the friction-band caused by its engagement with wheels $A^2$ shifts lever $H^3$ and thereby sets the brakes, the friction-band meantime serving as a powerful brake, and it may be equally effective with the brake-shoes K in stopping the cars. I will here remark that if the parts are well fitted, so that there is little or no lost motion, cords $h\ h^2$ on the one hand and cords $h'\ h^3$ on the other hand might connect directly with levers L, and if after long use the wear of the parts causes so much lost motion that brake-shoes K are not moved far enough for the purpose by cords $h\ h^2\ h'\ h^3$ these cords may then be applied to the shafts J J' in the manner already described, the only object of these shafts and rock-arms being to increase the movement transmitted to the brake-shoes.

Strong springs R R are attached to the truck-frame, for instance, as shown, the free ends of these springs having attached cords $r\ r$, leading in opposite direction, these cords attaching, as shown, to the brake-band. With such construction, in whichever direction the brake-band moves it will strain one of springs R, and when the brake-band is loosened the recoil of this strained spring will return the brake-band to its normal position, thereby returning lever $H^3$ to its normal or upright position, whereby the brakes are loosened. Lever G is provided at the free end thereof with sheave $g'$, over which cord I passes. Cord I also passes under sheaves $i\ i$, the latter, as shown, being located on a lower plane than sheave $g'$, and, as shown, are located on either side of the lever some little distance therefrom, sheaves $i\ i$ being attached, for instance, to cross-bars or any suitable attachment of the truck, but not shown. Now, if either end of cord I were made fast, by drawing on the other end of the cord lever G could be shifted from the position shown in dotted lines to its more inclined position. (Shown in solid lines.) The brake mechanism, therefore, is thrown off by drawing taut cord I, and the brakes are applied by releasing this cord. Now suppose, for instance, a train of freight-cars, each car being provided with my improved mechanism, as described, and that cord I extends from engine to the caboose, the cord being applied to each lever G, as indicated in diagram Fig. 5. The one end of the cord is shown attached to a small winch s, supposed to be located in the caboose, and the other end of the cord at the engine is supposed to have some suitable means for also winding up the cord. In this case the cord could be tightened from either end to release the brakes or could be loosened from either end to set the brakes, and in case of imminent danger the cord could be cut anywhere along the train to set the brakes; hence if a train were broken in two, as frequently occurs, the cord I would be broken and the brakes throughout the train would be instantly applied. This brake system should of course be more especially under the control of the engineer, and as on a long train there will be considerable slack rope to take up in releasing the brakes something better than a hand-winch should be provided for the convenience of the engineer; hence it is advisable to have a power-actuated reel of some kind directly under the control of the engineer.

There are probably a variety of power-reels that with more or less modification might be adapted to the purpose, or, in place of anything better, the device shown in Fig. 5 would answer the purpose, to wit: A drum M is provided on which to wind cord I, the axial shaft of this drum having also attached pinion m, the latter engaging gear N. On the same shaft with gear N is a pinion n, and this pinion is engaged by rack O.

P is a double-acting steam or air cylinder, the piston-rod of which connects with rack O aforesaid for reciprocating the latter endwise. A reversing-lever is of course provided, but not shown, for shifting the valve of such cylinder, and this reversing-lever is supposed to extend to where it is within easy reach of the engineer. By operating this reel the engineer can quickly wind up the cord to release the brakes, and may quickly unwind the cord more or less, according as he wishes to set the brakes strong or otherwise. It is believed that this brake mechanism, more especially for freight-trains, has many advantages over the air-brake system now in vogue, among which advantages not heretofore mentioned are comparative cheapness of construction and utility on detached cars. The device may be modified more or less, according to circumstances, to adapt it to different purposes—for instance, to adapt it to street-cars—and still retain the essential features thereof. For example, suppose cord I were attached directly to lever G and that this cord led to the right hand relative to Fig. 1. With such arrangement of the cord the lever could be shifted to the position shown in dotted lines to set the brakes simply by drawing on the cord, in which case the only other change necessary would be to turn spring H bottom upward, so that this spring would act upward on arms $d'$, and we would then have spring H for releasing the brakes and the cord for setting the brakes, which arrangement might be advisable for street-cars.

What I claim is—

1. In brake mechanism for cars, the combination, with car-axle and friction-wheels mounted thereon, of friction-band adapted to engage such friction-wheels, such friction-band being operatively connected with the car-brakes and having suitable appliances, substantially as shown, for making and breaking connections of friction-band with friction-wheels, substantially as set forth.

2. In combination, friction-wheels, friction-band adapted to engage such friction-wheels, such friction-band having sections overhanging the friction-wheels, a movable frame adapted to engage such overhanging section, and lever attachment, substantially as indicated, for shifting such frame in making and breaking connection between friction-band and wheels, substantially as set forth.

3. In combination, friction-wheels, friction-band, movable frames for making and breaking connection between such band and wheels, tightener for engaging the friction-band, and lever attachment, substantially as indicated, for simultaneously operating such tightener and movable frame, substantially as set forth.

4. In combination, friction-wheels, friction-band, movable frame and tightener, substantially as indicated, lever attachments for simultaneously operating the movable frame and tightener, spring for actuating such lever attachments in the one direction, and cord for reversing such lever attachments, substantially as set forth.

5. In combination, friction-wheels, friction-band, and mechanism, substantially as indicated, for making and breaking connection between friction band and wheels, and lever operatively connected with and adapted to be actuated by such friction-band, such lever being operatively connected with the car-brakes, substantially as set forth.

6. In combination, friction-wheels, friction-band, and mechanism, substantially as indicated, for making and breaking connection between such friction band and wheels, and lever operatively connected with such friction-band and with the brakes, such latter connections being in duplicate and connecting with such lever on opposite sides of the fulcrum of the lever, whereby the brakes are set in moving the lever in either direction, substantially as set forth.

7. In a brake, the combination, with a brake mechanism, a lever, and intermediate devices connecting the lever and brake mechanism, of a cord or rope secured at its opposite ends and engaging said lever for moving the latter in a direction to release the brakes and springs connected to said intermediate mechanism for setting the brakes when the tension on the cord or rope is relieved, substantially as set forth.

8. In a brake, the combination, with a brake mechanism, lever, a sheave mounted in the free end of said lever, a cord or rope secured at both ends and adapted to engage the sheave and hold the lever in the position it occupies while the brakes are off, idle sheaves located in a plane below the sheave on the lever and engaging said cord or rope, and intermediate mechanism connecting said lever and the brake mechanism, of a spring connected to said intermediate mechanism for setting the brakes when the tension on the cord or rope is relieved, substantially as set forth.

9. In a brake, the combination, in a train of cars, of brake mechanism, substantially as indicated, connected with the different cars, a shifting-lever on each car, mechanism connecting each shifting-lever with the brake mechanism of its respective car, a cord or rope extending the length of the train and engaging the several shifting-levers, devices for fastening, tightening, and releasing the cord in setting or releasing the brakes, and a spring connected to the mechanism between the brake mechanism and shifting-lever of each car, whereby when the pressure on the shifting-lever is relieved the brakes are set, substantially as set forth.

In testimony whereof I sign this specification, in the presence of two witnesses, this 10th day of October, 1889.

ALLEN J. WRIGHT.

Witnesses:
C. H. DORER,
ALBERT E. LYNCH.